(12) United States Patent
Johnsen et al.

(10) Patent No.: US 7,698,408 B1
(45) Date of Patent: Apr. 13, 2010

(54) METHOD AND APPARATUS FOR TESTING A NETWORK

(75) Inventors: Bjørn Dag Johnsen, Oslo (NO); Dag Moxnes, Oslo (NO); Line Holen, Fetsund (NO)

(73) Assignee: Oracle America, Inc., Redwood Shores, CA (US)

( * ) Notice: Subject to any disclaimer, the term of this patent is extended or adjusted under 35 U.S.C. 154(b) by 436 days.

(21) Appl. No.: 11/491,597

(22) Filed: Jul. 24, 2006

(51) Int. Cl.
G06F 15/173 (2006.01)
H04L 12/28 (2006.01)

(52) U.S. Cl. ...................... 709/223; 370/254
(58) Field of Classification Search ................. 709/223; 370/254
See application file for complete search history.

(56) References Cited

U.S. PATENT DOCUMENTS

| | | | | |
|---|---|---|---|---|
| 5,867,689 A * | 2/1999 | McLain, Jr. | ........... | 703/23 |
| 6,173,420 B1 * | 1/2001 | Sunkara et al. | ........... | 714/38 |
| 6,188,675 B1 * | 2/2001 | Casper et al. | ........... | 370/254 |
| 6,397,359 B1 * | 5/2002 | Chandra et al. | ........... | 714/712 |
| 6,487,208 B1 * | 11/2002 | Chirashnya et al. | ........... | 370/400 |
| 7,457,279 B1 * | 11/2008 | Scott et al. | ........... | 370/352 |
| 2002/0156888 A1 * | 10/2002 | Lee et al. | ........... | 709/224 |
| 2002/0181395 A1 * | 12/2002 | Foster et al. | ........... | 370/229 |
| 2002/0194316 A1 * | 12/2002 | Gous et al. | ........... | 709/221 |
| 2003/0001896 A1 * | 1/2003 | Johnson et al. | ........... | 345/771 |
| 2003/0086754 A1 * | 5/2003 | De La Fuente | ........... | 403/170 |
| 2003/0120852 A1 * | 6/2003 | McConnell et al. | ........... | 710/316 |
| 2003/0208572 A1 * | 11/2003 | Shah et al. | ........... | 709/223 |
| 2004/0172412 A1 * | 9/2004 | Files et al. | ........... | 707/104.1 |
| 2004/0253957 A1 * | 12/2004 | Pelaez et al. | ........... | 455/445 |
| 2006/0048846 A1 * | 3/2006 | Roenneburg et al. | ........... | 141/130 |
| 2006/0251259 A1 * | 11/2006 | Renkis | ........... | 380/270 |
| 2007/0179743 A1 * | 8/2007 | Tabor | ........... | 702/182 |

* cited by examiner

*Primary Examiner*—Ario Etienne
*Assistant Examiner*—Ho Shiu
(74) *Attorney, Agent, or Firm*—Park, Vaughan & Fleming LLP

(57) ABSTRACT

Accordingly, one embodiment of the invention provides a method for testing a network comprising multiple nodes. The network conforms to a formal specification. The method includes defining a blueprint comprising a set of one or more possible topological configurations for connecting a node to the network. The one or more possible topological configurations represent a subset of the topological configurations permitted by the formal specification. When connectivity is initiated between a node and the network, it is confirmed that the connectivity for the node conforms to the blueprint.

19 Claims, 7 Drawing Sheets

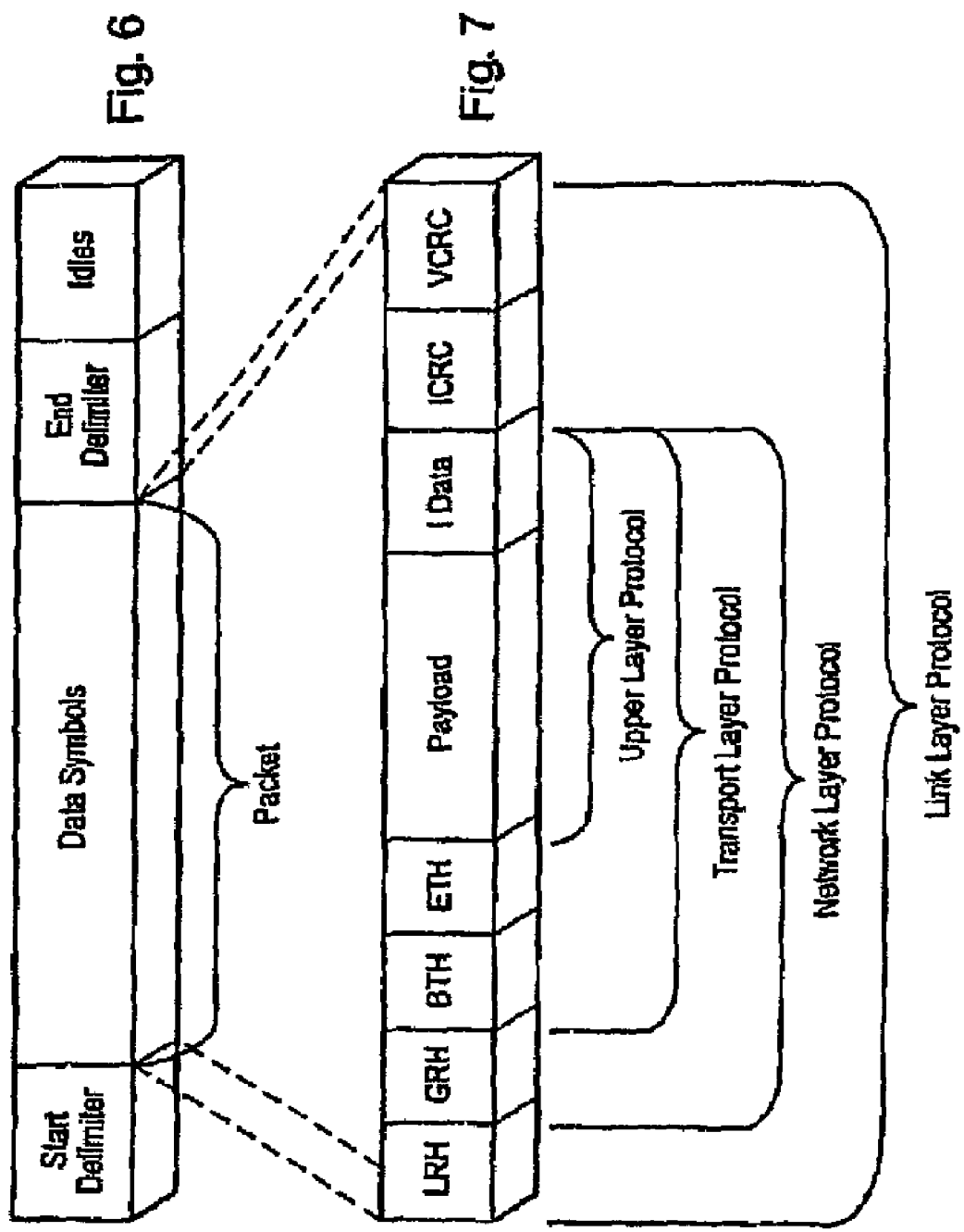

METHOD AND APPARATUS FOR TESTING A NETWORK

CROSS-REFERENCE TO RELATED APPLICATIONS

The present application is related to U.S. patent application Ser. No. 11/454,067 (Sun 060038), filed 14 Jun. 2006 and entitled "METHOD AND APPARATUS FOR TESTING A COMMUNICATION LINK", which is assigned to the assignee of the present application and which is hereby incorporated by reference in its entirety into the present application.

FIELD OF THE INVENTION

The present invention relates to networks, and in particular to the configuration of nodes and their connectivity to a network.

BACKGROUND OF THE INVENTION

The InfiniBand (IB) Architecture defines a computer networking architecture that allows end nodes to communicate with one another via a fabric or subnetwork (subnet) comprising one or more switches. A full definition of the IB Architecture may be found in the InfiniBand Architecture Specification Volumes 1 and 2, available from the InfiniBand Trade Association (www.infinibandta.org), which is hereby incorporated by reference.

The IB specification does not define any inherent restrictions on how to construct subnet topologies in terms of inter-connecting switches, apart from the main requirement that the resulting routes between end-nodes in the subnet must be free of potential deadlocks. This implies that a large number of configurations in terms of inter-switch connectivity may be legal according to the formal IB specification. However, such configurations may be sub-optimal or inadequately tested by a system vendor.

In addition, since the IB specification does not impose any real restrictions in terms of switch topology, a standard subnet manager implementation typically by default does not enforce any such restrictions. Indeed, the subnet manager may not even have support for explicit instructions to impose such restrictions. Consequently, if it is desired to select a routing through a particular set of links, it may not be possible to prevent the subnet manager from taking other (legal) switch-to-switch links into consideration within the routing logic.

SUMMARY OF THE INVENTION

Accordingly, one embodiment of the invention provides a method for testing a network comprising multiple nodes. The network conforms to a formal specification (such as the InfiniBand specification). The method includes defining a blueprint comprising a set of one or more possible topological configurations for connecting a node to the network. The one or more possible topological configurations represent a subset of the topological configurations permitted by the formal specification. The method further includes initiating connectivity between a node and the network and then confirming that the connectivity for the node conforms to the blueprint.

The use of a blueprint therefore allows a system vendor or other party (e.g. system integrator) to control what topologies (e.g. inter-switch link configurations) are used in a production system. In particular, a blueprint can be used to preclude certain configurations that are allowed by the formal network specification, such as configurations that do not satisfy some criterion (e.g. redundancy) that is not part of the formal specification, or configurations that have not been fully tested by the manufacturer. This latter aspect then allows the manufacturer to concentrate testing resources on the subset of configurations that are permitted by the blueprint.

The use of a blueprint also allows for an extension of the semantics of the standard link states in a way that maintains compatibility with the formal specification of the network (IB or otherwise). This allows the nodes concerned to be controlled by a generic or "off-the-shelf" subnet manager implementation that can remain unaware of the blueprint and the restrictions that it contains.

The blueprint can be used to impose a wide range of topological requirements. For example, if the node comprises a switch having multiple ports, the blueprint may specify a number (zero, some or perhaps all) of the multiple ports that are to be connected to an end node in the network (rather than to another switch). This blueprint might be used for example if it is desired for a switch to only link together multiple end nodes, without including any switch-switch connectivity.

As another example, a blueprint may specify a number of switch ports that are to be connected to another switch in the network (rather than to an end node). This blueprint might be used for example to create a combination of switches that act together as a single switch of higher radix than the individual switches.

The blueprint may further specify that some or all of the ports are to be connected to the same switch (rather than to different switches). Again, such a restriction may be helpful in creating a combination of switches that act together as a single switch of higher radix than the individual switches. In one embodiment, it is verified that multiple ports are indeed connected to the same switch by obtaining a switch id for the connection of each port and confirming that the switch id is the same for all relevant ports.

A blueprint may also specify the data rate to be used for a port having a particular connection. For example, a port having a link to another switch may be set to have a higher data rate than a port having a link to an end node. Again, such a limitation may be helpful in creating a combination of switches that act together as a single switch.

In one embodiment, the node comprises an end node, and the blueprint specifies a number of connections that are permitted from the end node to a single switch. Such a limitation may be used to ensure that different channel adapters in the end node are linked to different switches (which in turn helps to provide routing redundancy for the end node).

In one embodiment, confirming that the connectivity for the node conforms to the blueprint is performed as part of link testing. Accordingly, the blueprint testing may in effect be integrated into the other testing performed when a link is brought up (either to reflect a new node or a new connection). In one particular embodiment, confirming that the connectivity for the node conforms to the blueprint is performed after link training and prior to reporting successful link training to a subnet manager. This timing ensures that blueprint testing is hidden from (i.e. transparent to) a subnet manager, and accordingly does not require any special support from the subnet manager itself. Rather, the use of a blueprint is compatible with a generic subnet manager implementation. In one embodiment, if a particular link is found during the testing not to conform to the blueprint, then this may prevent reporting of successful link training to the subnet manager. This in turn will prevent the subnet manager commencing normal network communications over the link, and so avoid the network being utilised in a manner that contravenes the blueprint.

Note that testing when a connection is first brought up reflects the fact that the blueprint is primarily aimed at confirming intended configuration, since any change in configuration will involve a change in connectivity. (It is recognised that the actual configuration may depart from the intended configuration, for example if a node fails, but this is outside the remit of the blueprint testing).

In one embodiment, the blueprint is embedded in firmware for the node. In general, the blueprint can be updated to reflect the ongoing needs of any particular installation, for example by using subnet management packets or a special control interface for the node, or by any other appropriate update mechanism.

It will be appreciated that the various blueprint rules discussed above may be combined as appropriate to develop more complicated blueprints. In addition, other blueprint rules may be used instead of (or in combination with) the blueprint rules discussed above to regulate or control the network topology.

Another embodiment of the invention provides apparatus for use in a network comprising multiple nodes, wherein said network conforms to a formal specification. The apparatus comprises a blueprint specifying a set of one or more possible topological configurations for connecting a node to the network. The one or more possible topological configurations represent a subset of the topological configurations permitted by the formal specification. The apparatus further comprises testing logic responsive to an initiation of connectivity between a node and the network to confirm that the connectivity for the node conforms to the blueprint.

Note that the apparatus may be incorporated into the node being tested or made ancillary to the node.

Other embodiments of the invention provide a computer program and computer program product for implementing the various methods described above. These may benefit from the same features as the method and apparatus embodiments of the invention.

BRIEF DESCRIPTION OF THE DRAWINGS

Various embodiments of the invention will now be described in detail by way of example only with reference to the following drawings, in which like reference numerals pertain to like elements, and in which:

FIG. 6 shows schematically the structure of a message to be transmitted via an InfiniBand Architecture system.

FIG. 7 shows schematically the format of a packet of the message of FIG. 6.

DETAILED DESCRIPTION

1) The InfiniBand Architecture

The InfiniBand Architecture defines a switched communications fabric allowing many devices to communicate concurrently with high bandwidth and low latency in a protected, remotely managed environment. An end node can communicate over multiple InfiniBand Architecture ports and can utilise multiple paths through the InfiniBand Architecture fabric. A multiplicity of InfiniBand Architecture ports and paths through the network are provided both for fault tolerance and for increased data transfer bandwidth.

Figure 1:
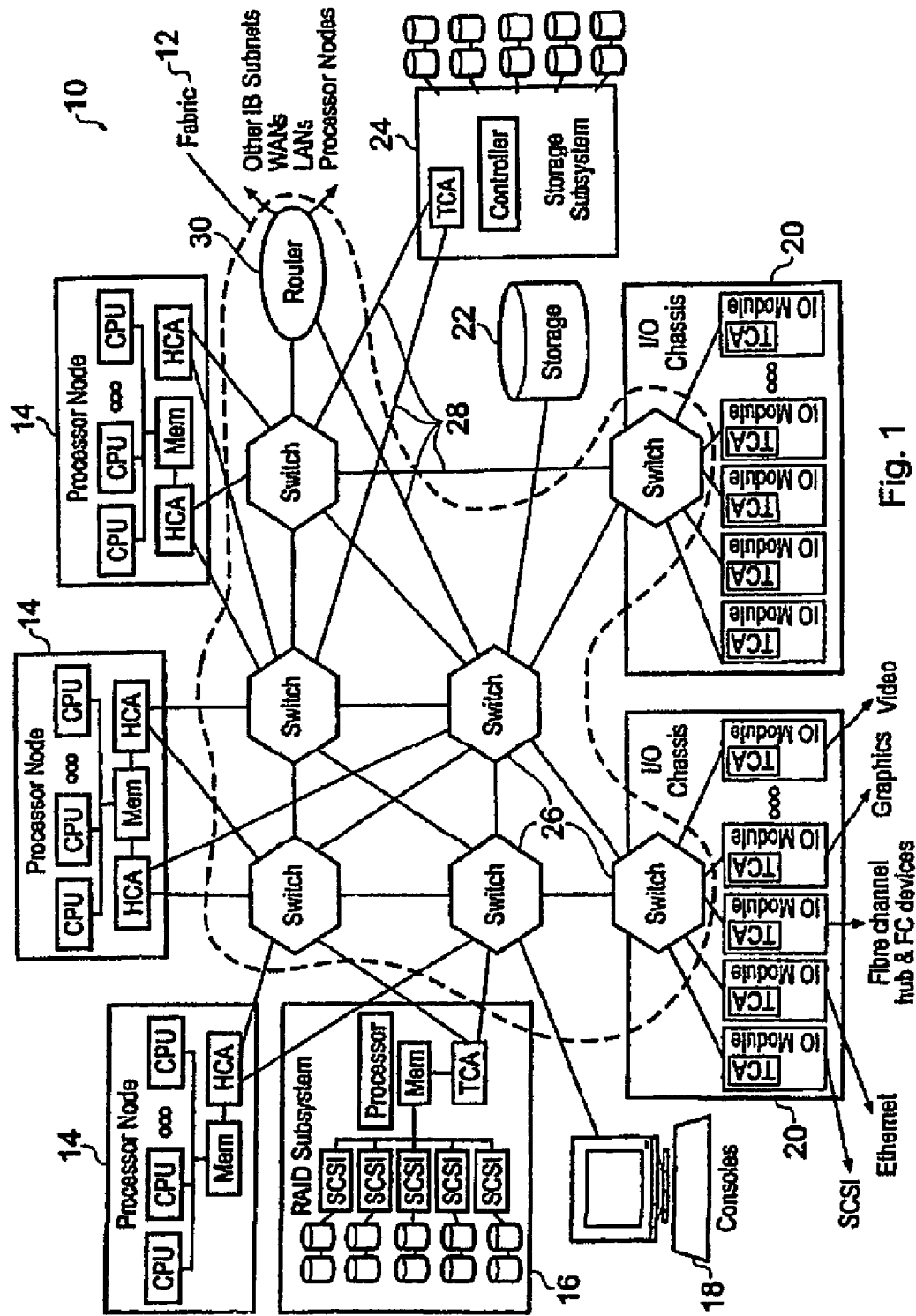
FIG. 1 is a schematic block diagram showing an example of interconnection of computing system elements via the InfiniBand networking architecture.

An example of an InfiniBand Architecture system area network is shown in FIG. 1. As can be seen from FIG. 1, the system area network 10 comprises an InfiniBand Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with InfiniBand links 28 providing data connections between the switches 26 and between the nodes attached to the fabric 12. Also included in the fabric 12 is a router 30 for providing connections to and from other networks, which may be other InfiniBand Architecture subnets, non-InfiniBand architecture LANs and WANs, and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each end node 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32.

The interconnects 28 may be one of three classes, 1x, 4x or 12x, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
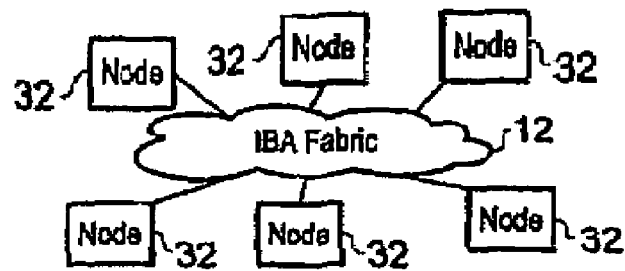
FIG. 2 is a schematic block diagram of a simplified arrangement of an InfiniBand Architecture system.
Figure 3:
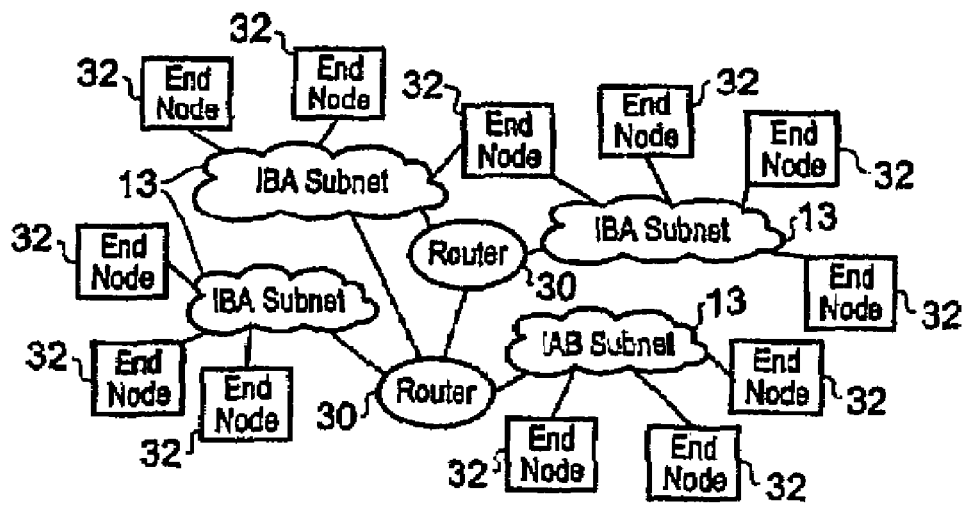
FIG. 3 is a schematic block diagram of another simplified arrangement of an InfiniBand Architecture system.
Figure 4:
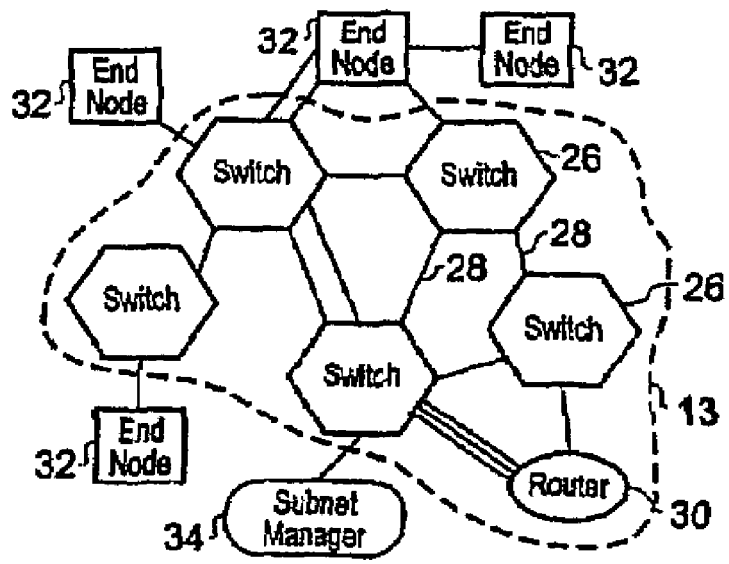
FIG. 4 is a schematic block diagram of a further simplified arrangement of an InfiniBand Architecture system.

Examples of possible InfiniBand Architecture topologies are shown in FIGS. 2, 3 and 4. FIG. 2 shows a high level simplified topology example where a number of end nodes 32 are interconnected by the fabric 12. An InfiniBand Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
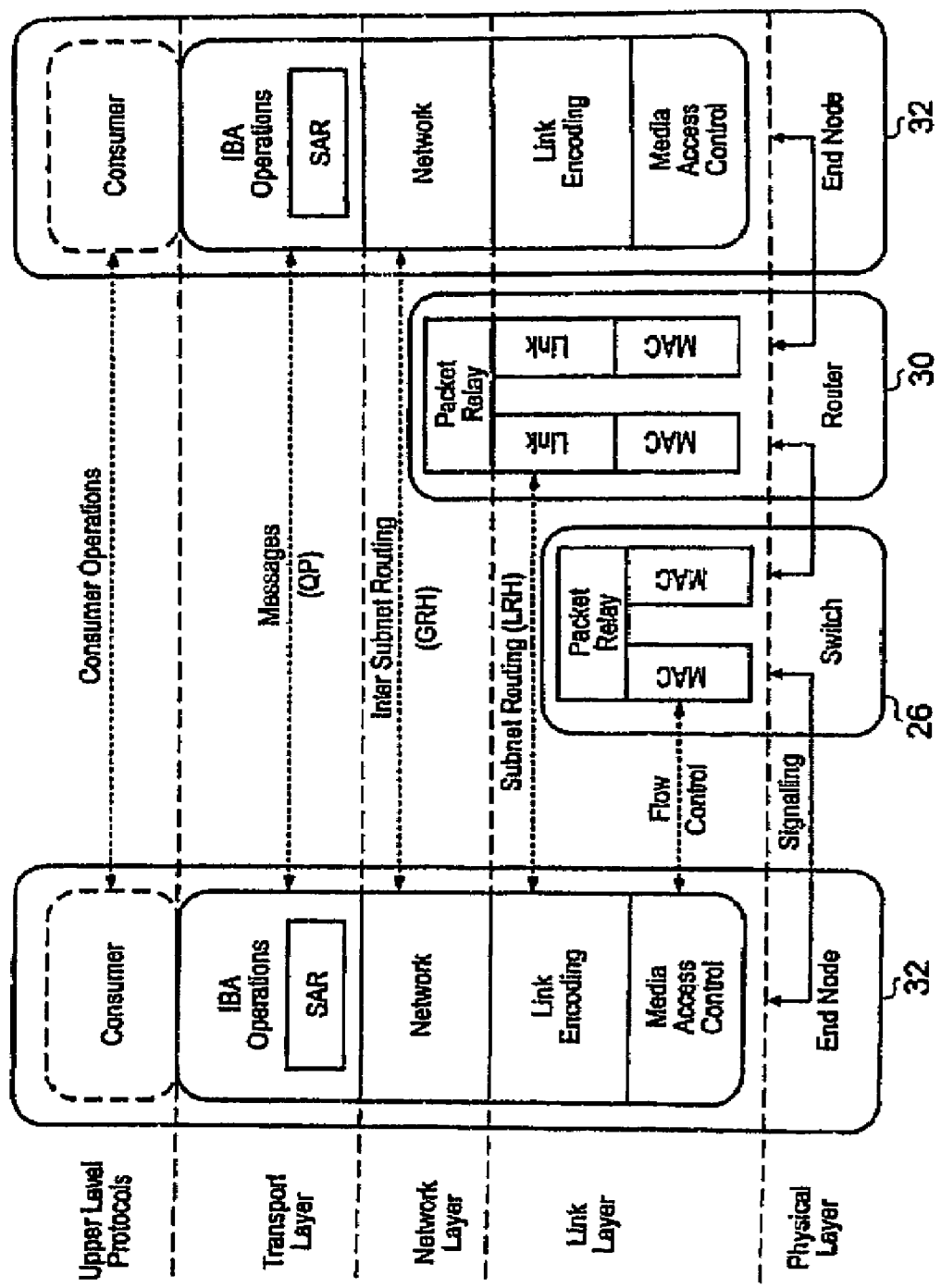
FIG. 5 is a schematic illustration of the layers of an InfiniBand Architecture system.

Referring now to FIG. 5, there is shown an illustration of the architecture layers of an InfiniBand Architecture system. Starting with the physical layer, this specifies how bits are placed onto the interconnections 28 and defines the symbols used for framing (i.e. start of packet and end of packet), data, and fill between packets (idles). It also specifies the signalling protocol as to what constitutes a validly formed packet (i.e. symbol encoding, proper alignment of framing symbols, no invalid or non-data symbols between start and end delimiters, no disparity errors, synchronisation method, etc.). The signalling protocol used by the InfiniBand Architecture utilises a differential signal. The interconnects 28 between nodes of an InfiniBand Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

The data packet format is illustrated in FIG. 7. Packets may be one of two types, IBA (InfiniBand Architecture) Packets or RAW (non InfiniBand Architecture) Packets. IBA Packets have IBA defined transport headers, are routed on InfiniBand Architecture fabrics 12, and use native InfiniBand Architecture transport facilities. Raw Packets may be routed on IBA fabrics but do not contain InfiniBand Architecture transport headers. From an InfiniBand point of view, these packets contain only InfiniBand routing headers, payload and CRC. The InfiniBand Architecture does not define the processing of these packets above the link and network layers. These packets can be used to support non-InfiniBand Architecture transports (e.g. TCP/IP, IPX/SPX, NetBUI etc) over an InfiniBand fabric.

The link layer describes the packet format and protocols for packet operation, e.g. flow control and how packets are routed within a subnet between the source and the destination. Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link.

The transmitter is the node sourcing data packets. The receiver is the consumer of the data packets. Each end of the link has a transmitter and a receiver. The InfiniBand Architecture utilises an "absolute" credit based flow control scheme, in which InfiniBand Architecture receivers provide a "credit limit". A credit limit is an indication of the total amount of data that a transmitter has been authorised to send since link initialisation.

Errors in transmission, in data packets, or in the exchange of flow control information can result in inconsistencies in the flow control state perceived by the transmitter and receiver. The InfiniBand Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement back to the originator end node to indicate whether all packets have been received successfully.

The upper level protocols are completely software based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
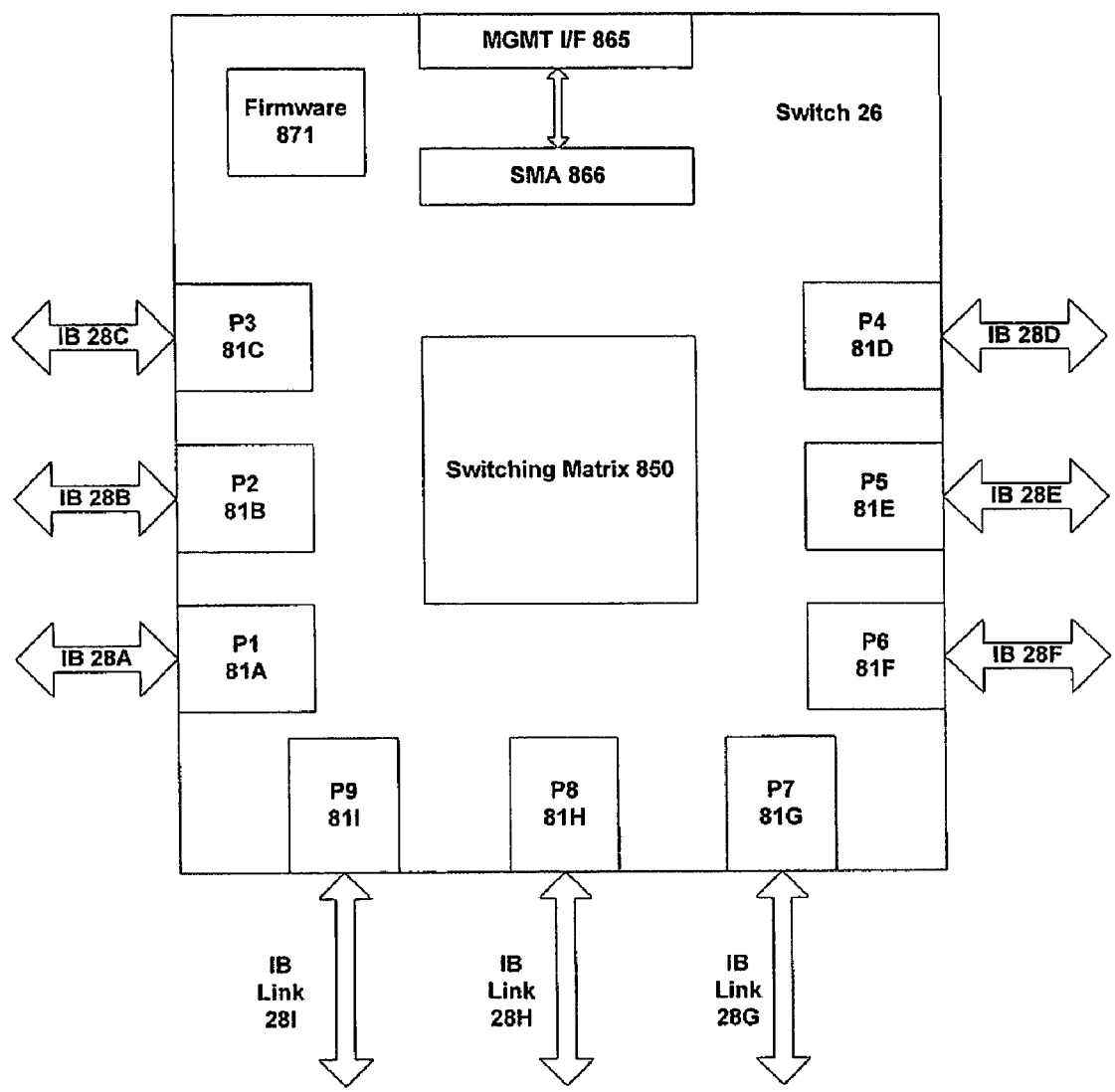
FIG. 8 is a schematic block diagram showing a switch for use in an InfiniBand network in accordance with one embodiment of the invention.

FIG. 8 illustrates a switch 26 for use in fabric 12 in accordance with one embodiment of the invention. Switch 26 is implemented as a semiconductor device, for example an application specific integrated circuit (ASIC), and includes a management control interface 865, a subnet management agent (SMA) 866, multiple ports 81, and a switching matrix 850. Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). Switch 26 further includes firmware 871 to perform various testing of switch 26, as described in more detail below.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the embodiment illustrated in FIG. 8, switch 26 has nine ports 81, denoted in FIG. 8 as P1 81A, P2 81B, P3 81C, P4 81D, P5 81E, P6 81F, P7 81G, P8 81H, and P9 81I. Each port is attached to a corresponding InfiniBand duplex link 28 providing transmit (Tx) and receive (Rx) capability, and comprising one, four or twelve physical lanes. Each physical lane provides a basic data rate of 2.5 GHz, so that switch 26 provides connectivity for a total of 108 (9×12) lanes. The physical lanes into any given port are managed as a single logical link, and can be flow controlled using a credit-based link level flow control, as described above.

In accordance with the InfiniBand Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An InfiniBand switch must support at least two virtual lanes on each link (i.e. data lane VL0 and management lane VL15). In one particular embodiment, switch 26 supports four virtual lanes for general data communication plus one virtual lane for management purposes (VL15).

In accordance with the InfiniBand Architecture, a packet can be specified as having one of sixteen different service levels (SLs). The service level for a particular packet is specified in the local route header (LRH), and remains constant as the packet transits an InfiniBand subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

2) Configuration Specification

In accordance with one embodiment of the invention, a set of one or more rules is provided to restrict the possible topological configurations for a node in network. These restrictions are over and above the set of legal restrictions imposed by the formal network specification. Instead, these rules may be imposed by the manufacturer, system integrator, system administrator, or any other appropriate person or organisation. The set of rules imposed on a network device is referred to herein as a blueprint. The rules may be expressed either in permissive or prohibitive form—i.e. to allow or to preclude a specified configuration—or as a combination of both.

As a simple example of a blueprint, it may be specified that a single switch should only connect to end nodes (rather than to another switch). In this case, the blueprint rules should indicate that any operational link (connected switch port) must be connected to a channel adapter and not to another switch port. This rule is independent of the port widths of the switch or the number of ports (radix) of the switch.

Another example relates to a cluster configuration in which each end node should have redundant access to a fabric configuration having two switches. The blueprint rules for the two switches in such a configuration may specify that a given end node is not allowed to have more than one link connected to a specific switch. This rule could then also be enforced by the end nodes themselves (providing they also support blueprint logic), so that each (redundant) channel adaptor port of an end node must connect to a different one of the two switches.

A slightly more complex scenario is where two individual switch instances are to be interconnected in order to provide a higher radix switching fabric. In order for a two-switch configuration to provide non-blocking bi-section bandwidth but still to represent a higher total radix than each of the individual switches, the individual ports of the switches are operated at different bandwidth levels. For example, in the case of an InfiniBand network, switch ports may operate in both four times and twelve times mode (i.e. a variable link width comprising four or twelve physical lanes per link) and/or at different signalling rates—e.g. both single data rate (SDR) and double data rate (DDR).

As a specific example, consider a switch that has nine ports, where each port can operate in either four or twelve times mode (but only at SDR data rate). In this case the blueprint rules for each switch can specify that the switch must have three ports (links) connected to the same other switch (with the same two-switch blueprint rules), and up to six ports (links) connected to the end nodes—i.e. channel adaptors. Further, the switch-switch links should operate in twelve times mode, whereas the switch-ca links should only operate in four times mode. In this way a non-blocking twelve port switch configuration has been constructed based on the two individual nine port switches.

In order to ensure explicitly that the correct pair of switches is connected, a fabric id or switch pair id may be defined as part of the blueprint information. This fabric or switch id must be found to match between the switches when verifying blueprint compliance of the remote switch end-points of the switch-switch links. However, there is no need to define different roles for the individual switches since the configuration is completely symmetrical. For the switch-ca links, the same type of rules as discussed above in relation to a single switch configuration might apply.

The same nine-port switch design also provides a building block for an eighteen port configuration formed from three leaf switches and a single core switch. In this case, the blueprint rules for the leaf switches are the same as for the switches in the twelve-port configuration except that three switch links for each leaf switch are to be connected to a single switch that is defined as the core switch. The core switch should share the same fabric id as the three leaf switches. For the switch that is assigned the core switch role, the blueprint rule is that it must have three links to each of the three leaf switch instances (which share the same fabric id).

For all of these configurations, it should be noted that the blueprint rules do not preclude the existence of degraded configurations—e.g. that some switch-switch link is currently not operational. However, no connectivity that violates the current blueprint rules is allowed—e.g. connectivity between three different switches in the twelve port configuration.

Another example of the use of a blueprint is to guard against any accidental change of connectivity, such as erroneous re-cabling by a computer-room operator. In particular, any new connectivity can be tested to ensure that it complies with the blueprint, thereby helping to avoid the risk of a negative impact on the (already) operational part of the system or subnet configuration.

A further example of the use of a blueprint is in a scenario where a dual, fully independent subnet configuration is desired. In such a system, the blueprint could be used to guard against introducing connectivity between any pairs of ports that are supposed to belong to different subnets (which would violate the system specification for independence).

Figure 9:
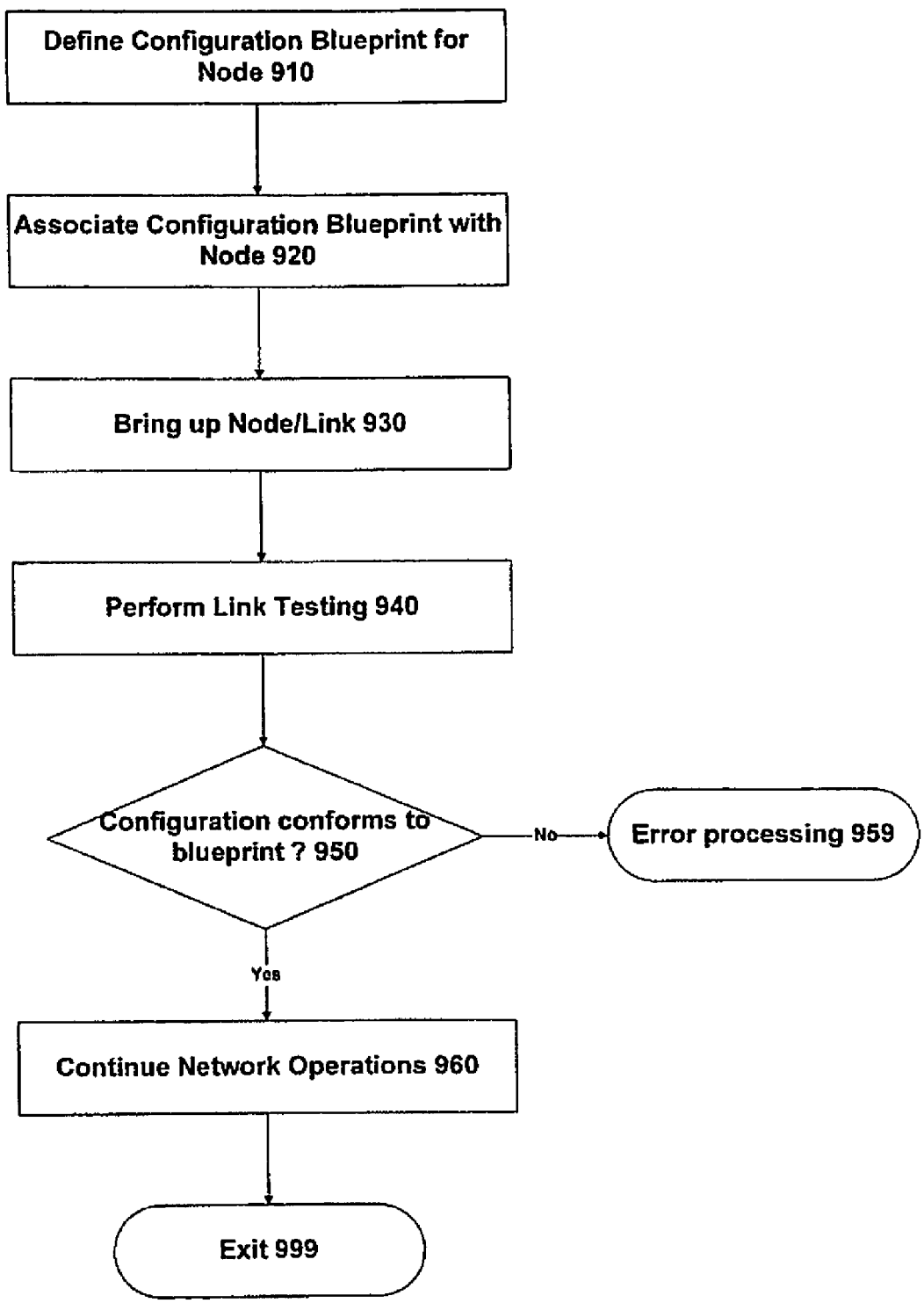
FIG. 9 is a high-level flowchart showing a method for configuring a network in accordance with one embodiment of the invention.

FIG. 9 provides a flowchart for a method for specifying and verifying blueprint configuration requirements in accordance with one embodiment of the invention. The method commences with defining a configuration blueprint that specifies the allowed connectivity of a node (i.e. switch or end-node) (910). This connectivity may be specified as a function of the role that the node is going to have in the network configuration, for example, first-stage end node connectivity, second stage cascading, and so on.

There are various ways in which the blueprint can be provided to (associated with) the node (920). One possibility is that the rules that define the blueprint are embedded in basic firmware 871 that represents the switch (node) control logic (including the Subnet Management Agent (SMA)). Another possibility is that such rules can either be downloaded as full rule sets using some external management interface like subnet management packets (SMP), or such rules may be defined in a step-by-step fashion, for example using a (local) Command-Line-Interface (CLI). Note that in some embodiments, a basic set of rules may be provided in the node firmware for all nodes. This basic set of rules may then be modified or supplemented to reflect the particular requirements of a specific installation. The blueprint rules may also be updated if the desired topology of the installation changes—for example, additional switch nodes may be included into the network to provide greater switching bandwidth.

The node and/or the connection of the node to the network is now brought up (930), and appropriate testing is performed on the node links (940). This testing is used (inter alia) to ascertain the current configuration, which can then be compared to the configurations allowed by the blueprint (950). If the current configuration conforms to the blueprint, then network operations continue (960). In particular, the link testing can complete and network communications can begin. However, if the current configuration does not conform to the blueprint, then appropriate error processing is performed (959). Such error processing may involve performing further diagnostics, attempting a reboot, notifying an operator etc, as appropriate. In the case where the violation of the blueprint rules can be determined (or is suspected) as being due to erroneous cabling of the system, probably the most relevant form of error processing is to notify the operator, since such cabling usually cannot be fixed by an automated repair operation. Note that even if the physical connectivity does not conform to the blueprint rules, it is generally still possible to perform link diagnostic operations in order to be able to ascertain and report the state of the physical link (even if this link is not supposed to be used in the configuration defined by the blueprint setting).

In one particular embodiment, the testing when the link is brought up at operation 930 is performed using the approach described in: "METHOD AND APPARATUS FOR TESTING A COMMUNICATION LINK", U.S. patent application Ser. No. 11/454,067, filed 14 Jun. 2006 (Sun 060038), and assigned to the assignee of the present application, and which application is incorporated by reference in its entirety into the present application.

Figure 10:
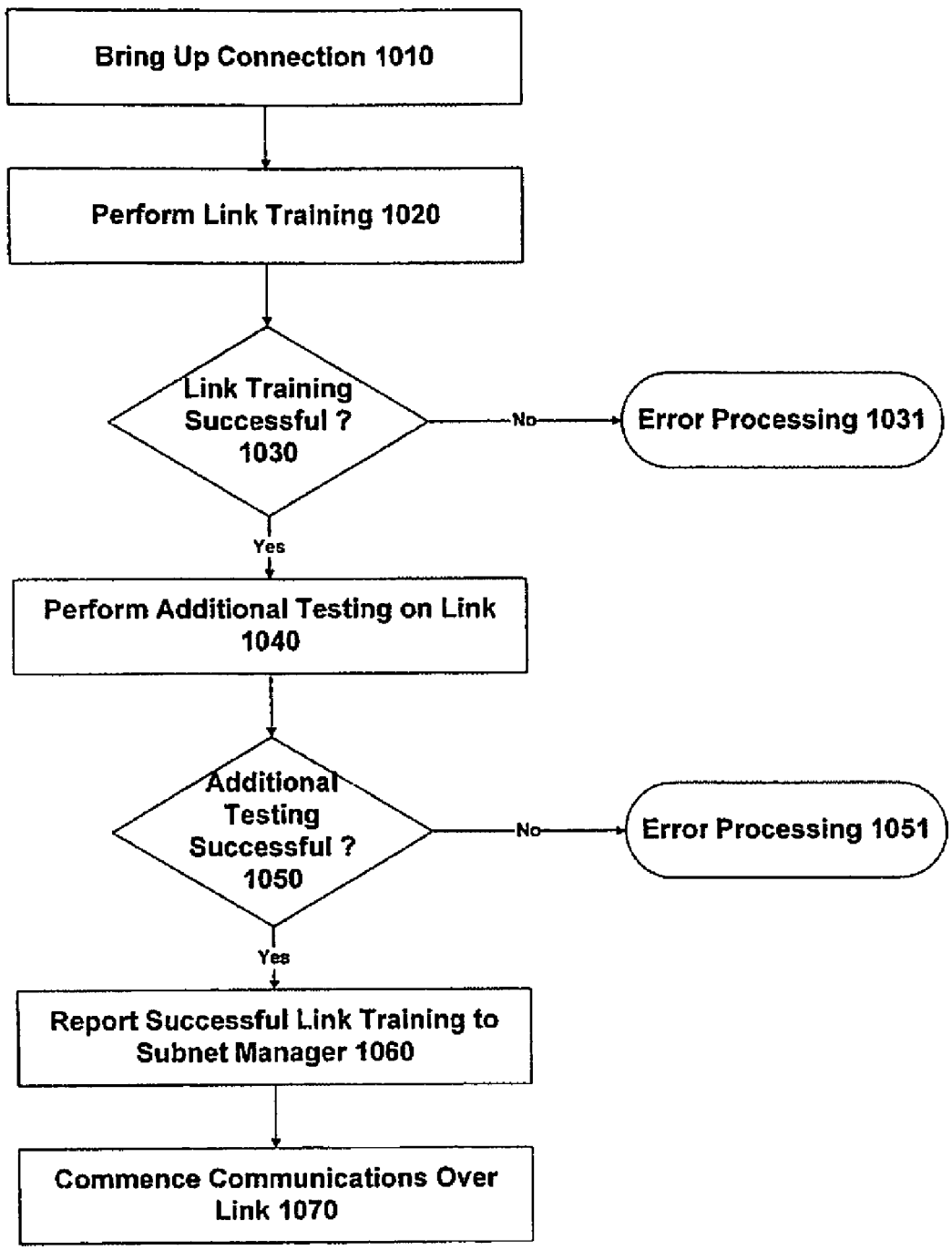
FIG. 10 is a high-level flowchart showing a method for link testing in accordance with one embodiment of the invention.

FIG. 10 is a high-level flowchart that illustrates a procedure for initialising a communications link using the approach described in U.S. patent application Ser. No. 11/454,067. This procedure may be implemented by a subnet management agent on a communications node, or by any other suitable form of node control logic. The processing of FIG. 10 commences with establishing or bringing up a connection over the link (1010). On some occasions, this may involve powering up a device that already has a physical connection to another device (that is already powered up). On other occasions, a connection may be established by plugging a cable into two nodes that are already on-line.

In response to establishing the new connection, the two nodes at either end of the link perform link training (1020). A determination is now made as to whether or not the link training was successful (1030), and if not some appropriate error processing is performed (1031). Note that since link training is defined as part of the IB specification, it is expected that such link training will be supported by all nodes on the network. In addition, since link training 1020 and error processing 1031 are performed in existing networks, these operations are already familiar to the skilled person and so will not be described further.

In a conventional IB system once link training has successfully completed, this is reported to the subnet manager. However, in the procedure of FIG. 10, such reporting is delayed until after additional testing is performed (1040). In particular, once a determination has been made that the additional testing was successful (1050), the completion of link training is reported to the subnet manager (1060). This then allows the subnet manager to start using the link for network communications (1070), as per a conventional IB system (this may involve further link testing by the subnet manager itself).

Alternatively, if the additional testing is unsuccessful, then appropriate error processing is performed (1051).

Since the additional testing of operation 1040 is performed prior to notifying the subnet manager that link training has completed (at operation 1060), from the perspective of the subnet manager the additional testing appears to be part of the link training. Since the subnet manager knows that the link is not available for use during link training, the subnet manager will not start normal network communications over the link during the additional testing. This then avoids any risk of the additional testing being impacted by network communications on behalf of the subnet manager (and vice versa). Furthermore, the delay in reporting completion of the link training to the subnet manager allows the additional testing to be shielded or hidden from the subnet manager. In particular, the additional testing (1040) may involve configurations that might otherwise confuse the subnet manager or cause it to flag an error if normal network communications were in progress. However, during link training (including anything that the subnet manager regards as link training), the subnet manager in effect ignores these configurations.

Note that the procedure of FIG. 10 does not require any special processing on behalf of the subnet manager. Rather, the subnet manager merely commences communications over the link at operation 1070 once it has received confirmation of successful link training at operation 1060. Since this represents conventional subnet manager behaviour in accordance with the IB specification, this allows the procedure of FIG. 10 to be adopted in a network with any subnet manager implementation that complies with the IB specification (or with an analogous standard for any other form of network).

It will be appreciated that the blueprint testing of FIG. 9 can be readily incorporated into the additional testing of FIG. 10. In particular, the testing of operation 940 in FIG. 9 can be implemented as part of the additional testing of operation 1040 of FIG. 10. If the current configuration does not conform to the blueprint (i.e. leading to a negative outcome for the operation 950 of FIG. 9), this corresponds to unsuccessful testing as per operation 1050 of FIG. 10, with error processing 959 corresponding to error processing 1051. Note however that the additional testing 1040 of FIG. 10 may include further testing (not just checking blueprint conformity as per operation 940).

Accordingly, the extended link bring-up protocol of FIG. 10 can be used to verify the connectivity of any local link prior to reporting that the port/link is in a state that allows an SM instance to continue bring-up. The extended link bringup protocol of FIG. 10 can be used to check for conformance with the relevant blueprint(s). In order for the connectivity that the link represents to be determined as legal, both sides of the link must agree that the connectivity is in accordance with the defined blueprint rules.

In one embodiment, if the remote end of the link does not support the extended link bring-up protocol of FIG. 10, this can be considered as a special case of violation of the blueprint rules. In some implementations, such a violation may be disregarded, depending upon the details of the blueprint rules themselves.

If the procedures of FIGS. 9 and 10 determine that the connectivity is prohibited (not supported) by the current blueprint definitions, the subnet manager (SM) does not receive any report of successful link training (i.e. processing does not pass to operation 960/1060). Accordingly, the SM will continue to observe the corresponding port/link as in a link-down state, and therefore will not pay attention to the link. However, at the underlying switch (node) control logic level, the illegal configuration can be reported so that appropriate error processing (949, 1051) can be performed. Such error processing may involve one or more service actions, e.g. re-cabling, to be carried out in order to obtain a configuration permitted by the blueprint.

It will be appreciated that the IB specification does already define mechanisms such as M_Keys and SM_Keys that are intended as a safeguard against unplanned connectivity which may cause severe problems in terms of interference between independent SM instances or subnet configurations. However, the outputs of such existing mechanisms using an "off-the-shelf" subnet manager implementation can be difficult to interpret—e.g. if there is just an SM level message about an unexpected key value, or an inability to configure a remote port as desired. In contrast, by making use of the blueprint requirements and the extended link bring-up protocol, it is possible to report a case of improper connectivity as a very clear and specific message that informs an operator exactly what is wrong, such as by providing information about a particular blueprint rule that has been violated. As an example, in the situation where two leaf switches have been erroneously connected, it can be reported that port X on leaf switch A has been connected to port Y on leaf switch B, which contravenes the rule of the current blueprint that prohibits any (direct) connectivity between switches configured as leaf switches (rather, the blueprint may specify that a leaf switch should only link to a core switch, as described above).

Accordingly, the approach described herein allows well-defined IB cluster fabric configurations to be defined, constructed and verified using a blueprint. This is accomplished moreover without depending on special support from an InfiniBand Subnet Manager implementation. Rather the blueprint mechanism can be integrated into the initial (extended) link testing protocol. Consequently, this approach helps to facilitate the deployment of systems that have a restricted and well-defined set of permitted configurations that can be automatically verified, and also allows for the provision of precise and instructive error messages. These factors in turn help to reduce costs associated both with system qualification and also with technical support arising from non-standard ways of connecting cluster fabric components.

The software components described herein may comprise program instructions and/or data instructions on some fixed, non-volatile storage, such as a hard disk or flash memory. These instructions and/or data structures can then be loaded for use into random access memory (RAM) for execution and use by a system processor, an application specific integrated circuit (ASIC), or by any other such device. Rather than being stored on a hard disk or other fixed device, part or all of the program instructions and/or data structures may also be stored on a removable storage medium, such as an optical (CD ROM, DVD, etc), magnetic (floppy disk, tape, etc), or semiconductor (removable flash memory) device. Alternatively, the program instructions and/or data structures may be downloaded via a transmission signal medium over a network, for example, a local area network (LAN), the Internet, and so on.

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:

1. A method for testing a network comprising multiple nodes, wherein said network conforms to a formal specification, the method comprising:

defining a blueprint comprising a set of one or more possible topological configurations for connecting a node to the network, wherein said one or more possible topological configurations represent a subset of the topological configurations permitted by the formal specification;

initiating connectivity between a node and the network;

performing link training on said connectivity for the node, wherein the link training is defined by the formal specification;

in response to successfully completing the link training, performing additional testing to determine whether said connectivity for the node conforms to said blueprint, wherein said connectivity for the node is not available for normal network communication during the additional testing; and in response to successfully completing the additional testing, reporting to a subnet manager the completion of the link training, thus allowing the subnet manager to start using said connectivity for the node for normal network communication.

2. The method of claim 1, wherein said node comprises a switch having multiple ports, and the blueprint specifies a number of said multiple ports that are to be connected to an end node in the network.

3. The method of claim 1, wherein said node comprises a switch having multiple ports, and the blueprint specifies a number of said multiple ports that are to be connected to another switch in the network.

4. The method of claim 3, wherein the blueprint further specifies that said number of multiple ports are to be connected to the same switch.

5. The method of claim 4, further comprising verifying that said number of multiple ports are connected to the same switch by obtaining a switch id for the connection of each port and confirming that the switch id is the same for all of said number of multiple ports.

6. The method of claim 1, wherein said node comprises a switch having multiple ports, and the blueprint specifies the data rate to be used for a port having a particular connection.

7. The method of claim 1, wherein said node comprises an end node, and the blueprint specifies a number of connections that are permitted from the end node to a single switch.

8. The method of claim 1, wherein if a particular link is found not to conform to said blueprint, this prevents reporting of successful link training to the subnet manager.

9. The method of claim 1, wherein the blueprint is embedded in firmware for the node.

10. A computer-readable storage medium storing instructions that when executed by a computer cause the computer to perform a method for testing a network comprising multiple nodes, wherein said network conforms to a formal specification, the method comprising:

defining a blueprint comprising a set of one or more possible topological configurations for connecting a node to the network, wherein said one or more possible topological configurations represent a subset of the topological configurations permitted by the formal specification;

initiating connectivity between a node and the network;

performing link training on said connectivity for the node, wherein the link training is defined by the formal specification;

in response to successfully completing the link training, performing additional testing to determine whether said connectivity for the node conforms to said blueprint, wherein said connectivity for the node is not available for normal network communication during the additional testing; and in response to successfully completing the additional testing, reporting to a subnet manager the completion of the link training, thus allowing the subnet manager to start using said connectivity for the node for normal network communication.

11. A computer system for use in a network comprising multiple nodes, wherein said network conforms to a formal specification, the computer system comprising:

a processor;

a memory;

a blueprint specifying a set of one or more possible topological configurations for connecting a node to the network, wherein said one or more possible topological configurations represent a subset of the topological configurations permitted by a formal specification; and testing logic responsive to an initiation of connectivity between a node and the network, wherein the testing logic is configured to:

perform link training on said connectivity for the node, wherein the link training is defined by the formal specification;

in response to successfully completing the link training, perform additional testing to determine whether said connectivity for the node conforms to said blueprint, wherein said connectivity for the node is not available for normal network communication during the additional testing; and in response to successfully completing the additional testing, report to a subnet manager the completion of the link training, thus allowing the subnet manager to start using said connectivity for the node for normal network communication.

12. The computer system of claim 11, wherein said node comprises a switch having multiple ports, and the blueprint specifies a number of said multiple ports that are to be connected to an end node in the network.

13. The computer system of claim 11, wherein said node comprises a switch having multiple ports, and the blueprint specifies a number of said multiple ports that are to be connected to another switch in the network.

14. The computer system of claim 13, wherein the blueprint further specifies that said number of multiple ports are to be connected to the same switch.

15. The computer system of claim 14, wherein the testing logic is further configured to verify the number of multiple ports connected to the same switch by obtaining a switch id for the connection of each port and confirming that the switch id is the same for all of said number of multiple ports.

16. The computer system of claim 11, wherein said node comprises a switch having multiple ports, and the blueprint specifies the data rate to be used for a port having a particular connection.

17. The computer system of claim 11, wherein said node comprises an end node, and the blueprint specifies a number of connections that are permitted from the end node to a single switch.

18. The computer system of claim 11, wherein the testing logic is configured such that if a particular link is found not to conform to said blueprint, this prevents reporting of successful link training to the subnet manager.

19. The computer system of claim 11, wherein the blueprint is embedded in firmware for the apparatus.

* * * * *